United States Patent
Jeon

(12) 
(10) Patent No.: US 6,205,331 B1
(45) Date of Patent: Mar. 20, 2001

(54) MEMORY SHARING METHOD FOR INTEGRATED DIGITAL CORDLESS TELEPHONE AND RADIO PAGING RECEIVER

(75) Inventor: Seon-A Jeon, Suwon (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/104,343

(22) Filed: Jun. 25, 1998

(30) Foreign Application Priority Data

Jun. 25, 1997 (KR) .................................. 97-27072

(51) Int. Cl.[7] .............................. H04Q 7/20; H04B 7/00; H04B 1/38
(52) U.S. Cl. .......................... 455/426; 455/38.1; 455/556
(58) Field of Search .................................. 455/552, 553, 455/524, 426, 557, 424, 556, 465, 460, 31.3, 38.1; 340/825.36, 825.44; 711/103, 155, 147, 148; 708/109

(56) References Cited

U.S. PATENT DOCUMENTS

| | | | |
|---|---|---|---|
| 4,477,808 | * 10/1984 | Ichikawa | 340/825.44 |
| 4,812,813 | * 3/1989 | Ide et al. | 340/311.1 |
| 5,117,449 | * 5/1992 | Metroka et al. | 455/552 |
| 5,134,717 | * 7/1992 | Rasmussen | 455/564 |
| 5,148,473 | * 9/1992 | Freeland et al. | 455/556 |
| 5,488,359 | * 1/1996 | Faris et al. | 340/825.44 |
| 5,541,976 | * 7/1996 | Ghisler | 455/426 |
| 5,652,571 | * 7/1997 | Shima et al. | 340/825.44 |
| 5,687,216 | * 11/1997 | Svensson | 455/412 |
| 5,737,707 | * 4/1998 | Gaulke et al. | 455/556 |
| 5,828,949 | * 10/1998 | Silver et al. | 455/38.3 |
| 5,854,984 | * 12/1998 | Buhrmann et al. | 455/550 |
| 5,884,188 | * 3/1999 | Hayes, Jr. | 455/552 |
| 5,898,758 | * 4/1999 | Rosenberg | 455/426 |
| 5,987,534 | * 11/1999 | Shibayama | 710/14 |
| 6,014,429 | * 1/2000 | LaPorta et al. | 379/88.15 |

* cited by examiner

*Primary Examiner*—Reinhard J. Eisenzopf
*Assistant Examiner*—Charles N. Appiah
(74) *Attorney, Agent, or Firm*—Dilworth & Barrese, LLP

(57) ABSTRACT

A method for sharing memory in a digital cordless telephone merged with a radio paging receiver. In the method, paging data is read from a second memory of the radio paging receiver, and a telephone number is edited by deleting data other than the telephone number from the paging data. The edited telephone number is stored in a first memory of the digital cordless telephone. To store the telephone number, it is checked whether a first memory of the cordless telephone has a spare storage area for storing a telephone number. If the first memory does not have the spare storage area, it is checked again whether a second memory of the radio paging receiver has a spare storage area. As a result, if the second memory has the spare storage area, the telephone number is stored in the second memory. However, the second memory does not have the spare storage area, the telephone number is overwritten in the first memory.

8 Claims, 4 Drawing Sheets

MEMORY SHARING METHOD FOR INTEGRATED DIGITAL CORDLESS TELEPHONE AND RADIO PAGING RECEIVER

BACKGROUND OF THE INVENTION

1. Field of the Invention

The present invention relates to a method of utilizing a memory in a digital cordless telephone, and more particularly, to a method for a sharing memory between an integrated digital cordless telephone and a radio paging receiver.

2. Description of the Related Art

Recently, with the development of mobile telecommunication technology, digital cordless telephones have come into wide use. A second generation digital cordless telephone (hereinafter referred to as a "CT-2") enables a telephone call within a 200-meter radius from a telepoint which is a wireless public base station. The CT-2 consists of a handset and a private base station like existing cordless telephones (CT-0 and CT-1), but it is distinguishable from the existing cordless telephone in that it is operable with a public base station, thus providing a superior function. The CT-2 merged with a radio paging receiver is called a CT-2 plus.

The radio paging receiver has a nonvolatile memory, EEPROM (Electrically Erasable and Programmable Read-Only Memory), and the CT-2 also has a separate EEPROM. Thus, the CT-2 plus has two EEPROMs. Both of these EEPROMs are used to store telephone numbers. However, the radio paging receiver can only store a limited number of paging data (i.e., telephone numbers) in its EEPROM. Therefore, when there are many paging calls received, the radio paging EEPROM cannot store all of the received telephone numbers. The EEPROM in the CT-2 also has a storage area where only a limited number of telephone numbers can be stored. These limiting aspects of the two EEPROMS in the CT-2 plus creates a need to share these two memories.

SUMMARY OF THE INVENTION

Accordingly, an object of the present invention is to provide a method of sharing memories in a digital cordless telephone merged with a radio paging receiver (CT-2 plus).

To achieve the above object, there is provided a memory sharing method in a digital cordless telephone merged with a radio paging receiver. In the method, paging data is read from a second memory of the radio paging receiver, and received paging data is edited by deleting data other than the telephone number. The edited paging data (i.e., only the telephone number) is stored in a first memory of the digital cordless telephone. In order to store the edited telephone number, the first memory of the cordless telephone is checked for a spare storage area. If the first memory does not have a spare storage area, a second memory of the radio paging receiver is checked again for a spare storage area. As a result, if the second memory has spare storage area, the telephone number is stored in the second memory. If the second memory does not have the spare storage area, the telephone number is overwritten into the first memory.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF PREFERRED EMBODIMENTS

Reference will now be made in detail to the preferred embodiment of the present invention. In describing the invention, well known functions or constructions have not been described so as not to obscure the present invention.

Figure 1:
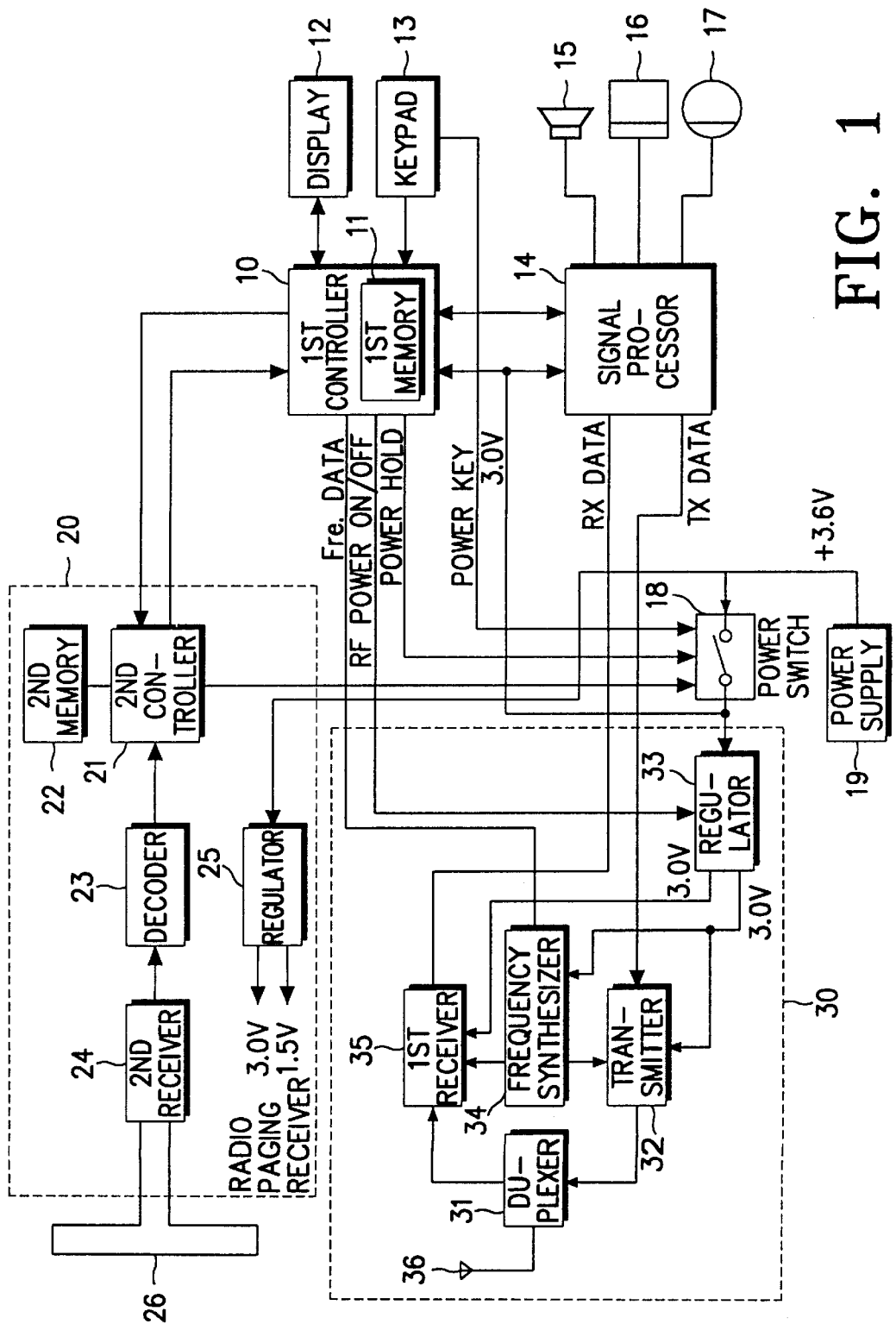
FIG. 1 is a block diagram of a CT-2 plus to which the present invention is applicable.

FIG. 1 is a block diagram of a CT-2 plus to which the present invention is applicable. Referring to FIG. 1, a first (main) controller 10 controls the general operation of the CT-2 plus. The first controller 10 has a central processing unit (CPU), and a first memory 11 consisting of a first ROM (Read-Only Memory) for storing an execution program according to the present invention, a first EEPROM, and a first RAM (Random Access Memory). The first EEPROM has a storage area for storing a predetermined number of telephone numbers. A display 12, composed of a liquid crystal display (LCD), displays various display data including an icon which represents the operating status of the CT-2 plus, under the control of the first controller 10.

A keypad 13 includes numeric keys for dialing and function keys for performing various functions. Keypad 13 inputs various commands to the radio paging receiver or the CT-2 according to the operating modes and outputs data to the first controller 10 by an external key operation.

The CT-2 includes an RF circuit 30 having a duplexer (or a Rx/Tx separator) 31, a first receiver 35, a transmitter 32, a frequency synthesizer 34 and a regulator 33. The regulator 33 regulates a supply voltage from a power supply 19 and provides the regulated voltage to the RF circuit 30. The frequency synthesizer 34 generates a frequency for designating the transmission/reception channels of the transmitter 32 and first receiver 35 under the control of the first controller 10. The duplexer 31 separates the transmission/reception channels, to transfer the transmission signal from transmitter 32 to antenna 36, and transfer the RF signal received via antenna 36 to first receiver 35. The first receiver 35 filters and low-noise-amplifies the RF signal separated from the duplexer 31, down-converts the amplified signal, and outputs it to a signal processor 14. The transmitter 32 up-converts the signal input from the signal processor 14 and outputs it to the duplexer 31 in the form of the RF signal.

The signal processor 14, operating under the control of the first controller 10, demodulates the digital signal input from the first receiver 35, converts it into an analog audio signal and outputs it via a speaker 15. In addition, the signal processor 14, connected to a microphone 17, converts the analog audio signal input from microphone 17 into a digital signal and outputs it to the transmitter 32. The signal processor 14 has a tone generator for generating a tone via a buzzer 16 under the control of the first controller 10.

Radio paging receiver 20 has an antenna 26 and includes a second controller 21, a second memory 22, a decoder 23, a second receiver 24 and a regulator 25. The second controller 21 controls the general operation of the radio paging receiver 20. Second controller 21 is connected to the first controller 10 via a communication line, enabling the interchange of data therebetween, and switches on a power switch 18 upon receipt of a paging signal. The power switch 18 provides isolated power to/from the RF circuit 30 in response to a switching control signal from the first controller 10. The second memory 22 includes a second ROM (not shown) for storing a program for performing a paging mode, a second RAM (not shown) for temporarily storing the data generated while the program is performed, and a second EEPROM (not shown). The second EEPROM has a storage area for storing a predetermined number of paging data. The second receiver 24 filters and amplifies the RF signal received from the antenna 26. The decoder 23 decodes the amplified paging signal output from the second receiver 24 and outputs it to the second controller 21.

Figure 2:
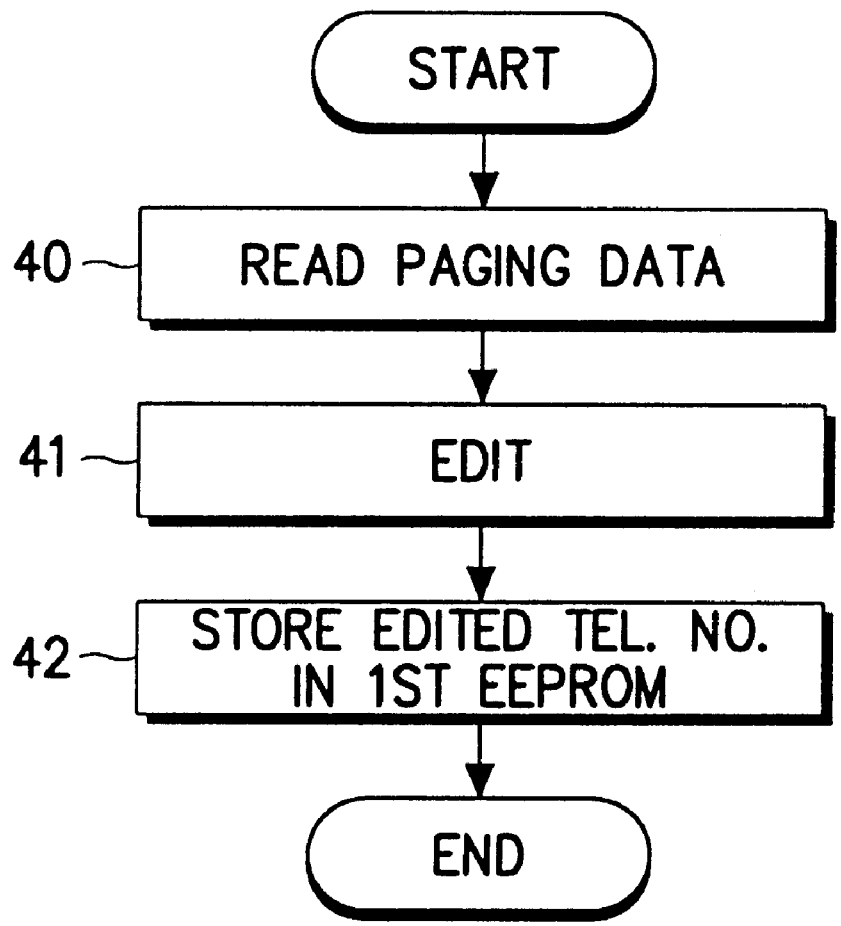
FIG. 2 is a flow chart for storing telephone numbers in a memory of the CT-2 by using paging data according to a preferred embodiment of the present invention.

FIG. 2 is a flow chart for storing the telephone numbers in the first memory 11 of the CT-2 by using the paging data according to a preferred embodiment of the present invention.

The paging data is stored in the second EEPROM and the telephone numbers are stored in the first EEPROM. For example, the paging data consists of "774-0908[01]," where the first 8 characters denote a telephone number and the next four characters denote the service form (e.g., the sequence in which the telephone number was received).

In operation, to edit (or dial) a telephone number by using the paging data stored in the second memory 22, the first controller 10 outputs a paging data request signal to the second controller 21. Upon receipt of the paging data request signal, the second controller 21 reads the paging data from the second EEPROM and outputs it to the first controller 10. In step 40 of FIG. 2, the first controller 10 receives (reads) and displays the paging data on the display 12. Then, at the sight of the paging data displayed on the display 12, a user will edit the telephone number by deleting unnecessary data following the telephone number, e.g., the data representing the service form and an additional number (e.g., 1004). In step 41, the first controller 10 edits the paging data according to the key operation by the user. If a STORE key is input, the first controller 10 stores the edited paging data consisting of just the telephone number in the first EEPROM in step 42.

Figure 3:
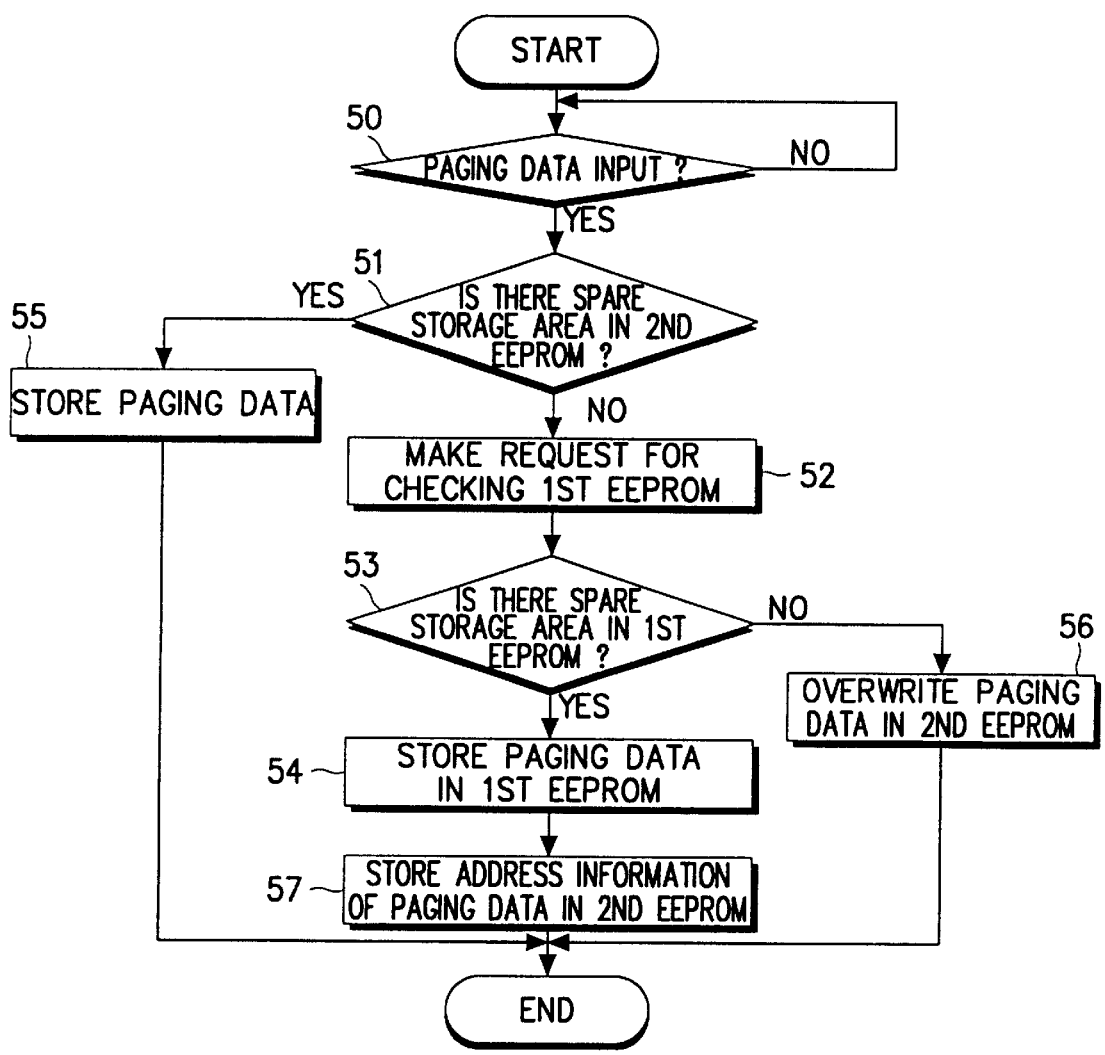
FIG. 3 is a flow chart showing how a radio paging receiver uses the memory in the CT-2 according to a preferred embodiment of the present invention.

FIG. 3 is a flow chart showing how the radio paging receiver uses the first memory 11 of the CT-2 according to the present invention. In step 50, the paging data is input via the decoder 23. In step 51, the second controller 21 accesses the second EEPROM in the second memory 22 to determine if there is a spare storage area for storing the received paging data. If it is determined in step 51 that there is no spare storage area, the second controller 21 requests the first controller 10 to check if there is a spare storage area in the first EEPROM. At the request of the second controller 21, the first controller 10 accesses the first EEPROM to check if there is a spare storage area. The first controller 10 transmits the result to the second control 21 via the communication line. If, however, it is determined in step 51 that there is a spare storage area in the second EEPROM, the second controller 21 stores the paging data in the second EEPROM in step 55.

If it is determined in step 53 that there is a spare storage area in the first EEPROM, the paging data is stored in the first EEPROM in step 54. In step 57, the second controller 21 transmits the address information of the paging data to the first controller 10, and the first controller 10 stores the address information in the first EEPROM. Then, the first controller 10 can access the paging data using the stored address information. If, however, it is determined in step 53 that there is no spare storage area in the first EEPROM, the second controller 21 stores the paging data in the storage area of the second EEPROM by overwriting existing data in the second EEPROM in step 56.

Figure 4:
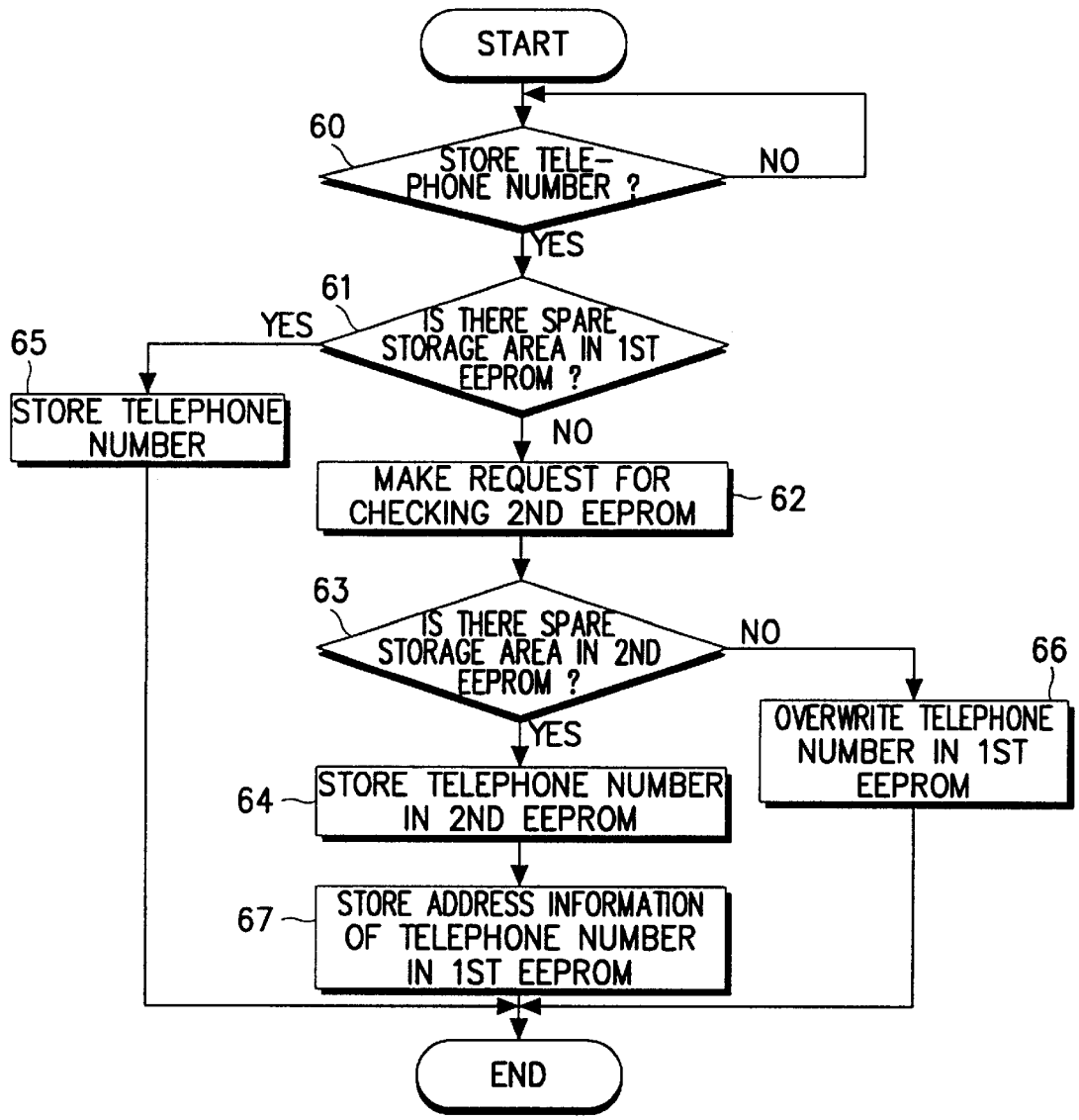
FIG. 4 is a flow chart showing how the CT-2 uses the memory in the radio paging receiver according to a preferred embodiment of the present invention.

FIG. 4 is a flow chart showing how the CT-2 uses the second memory 22 of radio paging receiver according to the present invention. If it is determined in step 60 that a telephone number is to be stored, the first controller 10 accesses the first EEPROM to check if there is any spare storage area in step 61. If it is determined in step 61 that there is no spare storage area, the first controller 10 requests the second controller 21 to check if there is a spare storage area in the second EEPROM in step 62. Upon receiving the request, the second controller 21 accesses the second EEPROM to check if there is any spare storage area, and outputs the result to the first controller 10. If it is determined in step 63 that there is a spare storage area in the second EEPROM, the first controller 10 transmits the telephone number to the second controller 21 via the communication line. The second controller 21 stores the telephone number in the spare storage area in the second EEPROM in step 64. In step 67, the second controller 21 transmits the address information of the telephone number to the first controller 10 and the first controller 10 stores it in the first EEPROM. Then, the first controller 10 can access the telephone number by using the address information stored in the first EEPROM to access the stored number in the second EEPROM.

If it is determined in step 61 that there is a spare storage area in the first EEPROM, the first controller 10 stores the telephone number in the first EEPROM in step 65. If it is determined in step 63 that there is no spare storage area in the second EEPROM, the first controller 10 stores the telephone number in the storage area in the first EEPROM by overwriting existing data in the first EEPROM in step 66.

As described above, the present invention can share the memories in the CT-2 merged with the radio paging receiver, thus making better use of the same.

It will be apparent to those skilled in the art that various modifications and variations can be made in a method for sharing the memory of a digital cordless telephone having a radio paging receiver therein of the present invention without departing from the spirit or scope of the invention. Thus, it is intended that the present invention covers the modifications and variations of this invention provided they come within the scope of the appended claims and their equivalents.

What is claimed is:

1. A method for sharing memory in an integrated digital cordless telephone and radio paging receiver, comprising the steps of:

determining whether a cordless telephone memory has a spare storage area for storing a telephone number;

determining whether a radio paging receiver memory has a spare storage area, when the cordless telephone memory does not have the spare storage area, and storing the telephone number in the radio paging receiver memory, when the radio paging receiver memory has the spare storage area.

2. The method as claimed in claim 1, further comprising the step of:

overwriting the telephone number into the cordless telephone memory, when the radio paging receiver memory does not have the spare storage area.

3. The method as claimed in claim 1, further comprising the step of:

storing address information of the stored telephone number in the cordless telephone memory.

4. The method as claimed in claim 1, wherein said step of determining whether the radio paging receiver memory has a spare storage area further comprises the step of sending a request to a controller in the paging receiver to check the radio paging receiver memory.

5. A method for sharing memory in an integrated digital cordless telephone and radio paging receiver, comprising the steps of:

determining whether a radio paging receiver memory has a spare storage area for storing paging data upon receipt of said paging data;

determining whether a digital cordless telephone memory has a spare storage area, when the radio paging receiver memory does not have the spare storage area, and storing the paging data in the digital cordless telephone memory, when the digital cordless telephone memory has the spare storage area.

6. A memory sharing method as claimed in claim 5, further comprising the step of:

overwriting the paging data into the radio paging receiver memory, when the digital cordless telephone memory does not have the spare storage area.

7. The method as claimed in claim 5, further comprising the step of:

storing address information of the stored paging data in the radio paging receiver memory.

8. The method as claimed in claim 5, wherein said step of determining whether the digital cordless telephone memory has a spare storage area further comprises the step of sending a request to a controller in the digital cordless telephone to the check the digital cordless telephone memory.

* * * * *